United States Patent Office 3,316,254
Patented Apr. 25, 1967

3,316,254
SULFAMOYL-2,1,4-BENZOAZADITHIAN-1,1-DIOXIDES
Frederick C. Novello, Berwyn, and James H. Jones, Blue Bell, Pa., assignors to Merck & Co., Inc., Rahway, N.J., a corporation of New Jersey
No Drawing. Filed Sept. 14, 1964, Ser. No. 396,375
19 Claims. (Cl. 260—243)

This invention is concerned with benzoazadithian compounds as well as methods for their preparation.

In particular, the invention is concerned with sulfamoyl-2,1,4-benzoazadithian - 1,1 - dioxide compounds that possess diuretic and saluretic properties and are therefore useful in the treatment of conditions associated with abnormal fluid and/or electrolyte retention.

Additionally the invention is concerned with the preparation of the benzoazadithian compounds by cyclizing a 2,4-disulfamoylmercaptobenzene with an aldehyde, acetal, ketone or ketal.

The preferred compounds of this invention can be represented by the following structure

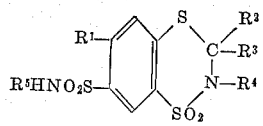

and physiologically acceptable salts thereof, wherein $R^1$ represents hydrogen, halogen (i.e., chloro, bromo, iodo, fluoro), halogen-like as trihaloalkyl especially trifluoromethyl, trichloromethyl and the like, lower alkyl, lower alkoxy, nitro or amino; $R^2$ and $R^3$ can be similar or dissimilar radicals selected from hydrogen; lower alkyl; substituted lower alkyl as haloalkyl, or cycloaliphatic alkyl; cycloaliphatic having 5 or 6 carbons in the ring; phenyl or substituted phenyl, especially having as substituents alkyl, alkoxy or halogen groups; phenalkyl or substituted phenalkyl wherein either or both the phenyl or alkyl moieties can be substituted and additionally the carbons of the alkyl moiety can be interrupted by hetero atom or atoms especially by sulfur; or $R^2$ and $R^3$ can be linked to form with the carbon atom to which they are attached a spiro-aliphatic group that can be composed entirely of carbon atoms or can contain one or more hetero atoms especially as sulfur, nitrogen, or oxygen; and can be either unsubstituted or substituted especially alkyl or halo substituted; and $R^4$ and $R^5$ can also be similar or dissimiliar radicals selected from hydrogen, lower alkyl, substituted lower alkyl, lower alkenyl and the like.

The above described compounds can be prepared for oral administration by admixing a sufficient quantity of active ingredient to elicit a diuretic and/or saluretic response with the usual diluents, extenders, binders and/or lubricants employed in preparing capsules, pills, tablets or powders or they can be incorporated in elixirs. Additionally the compounds can be dissolved in aqueous media suitable for parenteral injection.

The benzoazadithian compounds are prepared by causing an aldehyde, acetal, ketone or ketal to react with the disulfamoylmercaptobenzene. The reaction is facilitated by moderate heating of the reaction mixture which advantageously includes a solvent and an inorganic (suitably hydrochloric) or organic acid. The benzoazadithian usually is insoluble in the reaction mixture and can be separated readily.

The disulfamoylmercaptobenzene compounds also are new compounds and form a part of this invention. These can be prepared by causing the desired 2,4-disulfamoylhalobenzene to react with sodium polysulfide. The reaction is facilitated by moderate heating of the reactants dissolved in a solvent. The disulfamoylmercaptobenzene thus prepared can be separated and purified by conventional methods.

The di-(alkylsulfamoyl)mercaptobenzene compounds, particularly those having a 5-trihaloalkyl gorup also can be made by diazotizing a 5-$R^1$-2,4-di(alkylsulfamoyl) aniline, then reacting the diazonium compound formed with an alkali xanthate (suitably sodium or potassium xanthate) to give, after alkaline hydrolysis, the 5-$R^1$-2,4-di(alkylsulfamoyl)mercaptobenzene compound. This compound then is cyclized by the above described process to yield end products having the structure reproduced above wherein $R^4$ and $R^5$ are alkyl groups.

This invention will be described in greater detail in the following examples that serve to illustrate the best mode known to applicants for the preparation of certain benzoazadithian compounds which are illustrative of those embraced by this invention.

EXAMPLE 1.—6-CHLORO-7-SULFAMOYL-2,1,4-BENZOAZADITHIAN-1,1-DIOXIDE

*Step A.—Preparation of 5-chloro-2,4-disulfamoyl-mercaptobenzene*

A mixture of 6.0 g. of 2,4-disulfamoyl-1,5-dichlorobenzene, 5.0 g. of sodium polysulfide nonahydrate, 1.0 g. of sulfur in 150 ml. of ethanol is heated under reflux for 1.5 hours cooled, filtered and concentrated to dryness in vacuo. The residue is dissolved in 50 ml. of saturated sodium bicarbonate solution, treated with charcoal, filtered and acidified with hydrochloric acid. The product is collected and purified by reprecipitation from aqueous sodium bicarbonate to give 5-chloro-2,4-disulfamoylmercaptobenzene, M.P. 282–285° C. dec.

*Analysis.*—Calculated for $C_6H_7ClN_2O_4S_3$: C, 23.78; H, 2.33; S, 31.70. Found: C, 23.70; H, 2.25; S, 31.56.

*Step B.—Preparation of 6-chloro-7-sulfamoyl-2,1,4-benzoazadithian-1,1-dioxide*

A solution of 3.0 g. of 5-chloro-2,4-disulfamoylmercaptobenzene and 0.3 g. of paraformaldehyde in 60 ml. of ethanol and 60 ml. of 6 normal hydrochloric acid is heated under reflux for 4 hours and cooled. The precipitate is collected and recrystallized from ethanol-water to give 6-chloro-7-sulfamoyl-2,1,4-benzoazadithian-1,1-dioxide as colorless needles, M.P. 259–262° C. dec.

*Analysis.*—Calculated for $C_7H_7ClN_2O_4S_3$: C, 26.68; H, 2.24; N, 8.89. Found: C, 27.14; H, 2.59; N, 8.79.

EXAMPLE 2.—6-METHYL-7-SULFAMOYL-2,1,4-BENZOAZADITHIAN-1,1-DIOXIDE

*Step A.—Preparation of 5-methyl-2,4-disulfamoylmer-captobenzene*

A solution of 10 g. of sodium polysulfide nonahydrate and 2.0 g. of sulfur in 100 ml. of ethanol is heated under reflux for 30 minutes. 5-methyl-2,4-disulfamoylchlorobenzene (11.2 g.) is added and heating is continued for 18 hours. The solution is concentrated to dryness in vacuo and the residue is stirred at room temperature with 100 ml. of water and 25 ml. of sodium bicarbonate solution and then treated with charcoal, filtered and acidified. The product is collected and recrystallized from water and a trace of ethanol to give 5-methyl-2,4-disulfamoylmer-captobenzene, M.P. 228–231° C.

*Analysis.*—Calculated for $C_7H_{10}N_2O_4S_3$: C, 29.75; H, 3.57; N, 9.91. Found: C, 29.91; H, 3.59; N, 9.80.

*Step B.—Preparation of 6-methyl-7-sulfamoyl-2,1,4-benzoazadithian-1,1-dioxide*

A solution of 2.8 g. of 5-methyl-2,4-disulfamoylmer-captobenzene and 0.4 g. of paraformaldehyde in 30 ml.

of ethanol and 30 ml. of 6 N hydrochloric acid is heated under reflux for 18 hours and concentrated to dryness in vacuo. The product is recrystallized from ethanol-water to give 6-methyl-7-sulfamoyl-2,1,4-benzoazadithian-1,1-dioxide, M.P. 234–236° C. dec.

Analysis.—Calculated for $C_8H_{10}N_2O_4S_3$: C, 32.60; H, 3.42; N, 9.52. Found: C, 33.12; H, 3.81; N, 9.38.

EXAMPLE 3.—SPIRO[6-METHYL - 7 - SULFAMOYL-2,1,4 - BENZOAZADITHIAN - 1,1 - DIOXIDE-3,1'-(4'-METHYL)CYCLOHEXANE]

A solution of 2.8 g. of 5-methyl-2,4-disulfamoylmercaptobenzene and 4-methylcyclohexanone (1.2 ml.) in 30 ml. of ethanol and 30 ml. of 6 N hydrochloric acid is heated under reflux for 4 hours and concentrated to dryness in vacuo. The product is collected and recrystallized from ethyl acetate-hexane to give spiro[6-methyl-7-sulfamoyl - 2,1,4-benzoazadithian-1,1-dioxide-3,1'-(4'-methyl)cyclohexane], M.P. 209–211° C.

Analysis.—Calculated for $C_{14}H_{20}N_2O_4S_3$: C, 44.72; H, 5.35; N, 7.44. Found: C, 44.96; H, 5.56; N. 7.48.

EXAMPLE 4.—6-BROMO-7-SULFAMOYL-2,1,4-BENZOAZADITHIAN-1,1-DIOXIDE

This compound is prepared by replacing the 2,4-disulfamoyl-1,5-dichlorobenzene employed in Step A, Example 1, by an equivalent quantity of 2,4-disulfamoyl-1,5-dibromobenzene and following the reaction conditions and using the other reactants called for in Steps A and B of Example 1.

EXAMPLE 5.—2-METHYL-6-TRIFLUOROMETHYL-7-METHYLSULFAMOYL - 2,1,4 - BENZOAZADITHIAN-1,1-DIOXIDE

Step A.—Preparation of 5-trifluoromethyl-2,4-di(methylsulfamoyl)mercaptobenzene

A solution of 34.7 g. (0.1 mole) of 5-trifluoromethyl-2,4-di(methylsulfamoyl)aniline in 200 ml. 1 N sodium hydroxide is treated dropwise at 0° C. with a cold solution of 7 gm. of sodium nitrite in 175 ml. of concentrated hydrochloric acid. The diazonium salt is then added to a solution of 40 g. of potassium ethyl xanthate in 150 ml. of water maintained at 80° C. The precipitate is separated and heated under reflux for 3 hours with a solution of 86 g. of potassium hydroxide in 150 ml. of ethanol and 75 ml. of water. The solution is diluted with 1 liter of water, filtered and acidified in the cold with hydrochloric acid. The product is collected and recrystallized from alcohol-water to give 5-trifluoromethyl-2,4-di(methylsulfamoyl)-mercaptobenzene.

Step B.—Preparation of 2-methyl-6-trifluoromethyl-7-methylsulfamoyl-2,1,4-benzoazadithian-1,1-dioxide This product is prepared by cyclizing the 5-trifluoromethyl - 2,4 - di(methylsulfamoyl)mercaptobenzene, obtained as described in Step A by reaction with paraformaldehyde by substantially the same procedure described in Example 1, Step B.

EXAMPLE 6.—2-ETHYL-6-METHOXY - 7 - ETHYLSULFAMOYL - 2,1,4 - BENZOAZADITHIAN - 1,1-DIOXIDE

Step A.—Preparation of 5-methoxy-2,4-di(ethylsulfamoyl)-aniline 5-methoxyaniline-2,4-disulfonyl chloride (32 g., 0.1 M.) is added portion to 150 ml. 40% aqueous ethylamine and heated on the steam bath for 1 hour. The mixture is cooled and the product collected, washed with water and recrystallized from ethanol-water to give 5-methoxy-2,4-di(ethylsulfamoyl)aniline.

Step B.—Preparation of 5-methoxy-2,4-di(ethylsulfamoyl)-mercaptobenzene

The product obtained in Step A is diazotized and then reacted with potassium ethyl xanthate by the procedure described in Step A of Example 5 to give 5-methoxy-2,4-di(ethylsulfamoyl)mercaptobenzene.

Step C.—Preparation of 2-ethyl-6-methoxy-7-ethylsulfamoyl-2,1,4-benzoazadithian-1,1-dioxide The compound obtained in Step B is cyclized with paraformaldehyde by substantially the same procedure described in Example 1, Step B, to give 2-ethyl-6-methoxy-7-ethylsulfamoyl-2,1,4-benzoazadithian-1,1-dioxide.

EXAMPLE 7.—6-METHOXY-7-SULFAMOYL-2,1,4-BENZOAZADITHIAN-1,1-DIOXIDE

Step A.—Preparation of 5-methoxy-2,4-disulfamoylchlorobenzene m-Chloroanisole (0.5 mol.) is added dropwise over a period of 1 hour to an excess (about 400 ml.) of chlorosulfonic acid cooled in an ice bath. Sodium chloride (350 g.) is added portionwise over 2 hours and the mixture then heated in an oil bath for about 3 hours. After thorough cooling in an ice bath, the reaction mixture is treated with 1 liter of ice water, the product that separates is taken up in ether, washed with water and dried. The solvent is removed by evaporation and the residue, cooled in an ice bath, is treated with 28% ammonium hydroxide (150 ml.). When the initial vigorous reaction subsides, the reaction mixture is warmed on a steam bath for about 1 hour, cooled and the precipitated 5-methoxy-2,4-disulfamoylchlorobenzene collected.

Step B.—Preparation of 5-methoxy-2,4-disulfamoylmercaptobenzene

This product is prepared by reacting 5-methoxy-2,4-disulfamoylchlorobenzene with sodium polysulfide by substantially the same procedure and employing the other reagents of Example 1, Step A.

Step C.—Preparation of 6-methoxy-7-sulfamoyl-2,1,4-benzoazadithian-1,1-dioxide

The 5-methoxy-2,4-disulfamoylmercaptobenzene is cyclized with paraformaldehyde by substantially the same procedure described in Example 1, Step B, to give 6-methoxy-7-sulfamoyl-2,1,4-benzoazadithian-1,1-dioxide.

EXAMPLE 8.—3-DICHLOROMETHYL-6-METHOXY-7 - SULFAMOYL - 2-,1,4-BENZOAZADITHIAN-1,1-DIOXIDE

The 5-methoxy-2,4-disulfamoylmercaptobenzene, prepared in Example 7, Steps A and B, is cyclized with dichloroacetaldehyde diethylacetal by the method described in Example 1, Step B, to give 3-dichloromethyl-6-methoxy-7-sulfamoyl-2,1,4-benzoazadithian-1,1-dioxide.

EXAMPLE 9.—6-NITRO-7-SULFAMOYL-2,1,4-BENZOAZADITHIAN-1,1-DIOXIDE

Step A.—Preparation of 5-nitro-2,4-disulfamoylmercaptobenzene

This compound is prepared by causing 5-nitro-2,4-disulfamoylchlorobenzene to react with sodium polysulfide by the process and using the other reactants described in Example 1, Step A.

Step B.—Preparation of 6-nitro-7-sulfamoyl-2,1,4-benzoazadithian-1,1-dioxide

The 5-nitro-2,4-disulfamoylmercaptobenzene prepared in Step A then is cyclized by reaction with paraformaldehyde by the method described in Step B of Example 1 to yield 6-nitro-7-sulfamoyl-2,1,4-benzoazadithian-1,1-dioxide.

EXAMPLE 10.—6-AMINO-7-SULFAMOYL-2,1,4-BENZOAZADITHIAN-1,1-DIOXIDE

A solution of 3.25 g. (0.01 mole) of 6-nitro-7-sulfamoyl-2,1,4-benzoazadithian-1,1-dioxide (from Example 9) in 500 ml. of 50% ethanol-water is hydrogenated in the presence of platinum oxide (400 mg.) at room temperature in a Parr apparatus. The catalyst is removed by filtration and the solution concentrated to dryness in vacuo. The residue is recrystallized from alcohol-water to give 6-amino-7-sulfamoyl-2,1,4-benzoazadithian-1,1-dioxide.

EXAMPLE 11.—3 - BENZYLMERCAPTOMETHYL-6-CHLORO - 7 - SULFAMOYL-2,1,4-BENZOAZADITHIAN-1,1-DIOXIDE

This product is prepared by replacing the paraformaldehyde used in Step B of Example 1 by benzylmercaptoacetaldehyde and then following the same procedure and using the other reactants called for therein.

EXAMPLE 12. — SPIRO[6-CHLORO-7-SULFAMOYL-2,1,4 - BENZOAZADITHIAN-1,1-DIOXIDE-3,4'-(1'-ETHYL)PIPERIDINE]

This product is prepared by following the procedure described in Example 3 except the mercaptobenzene and ketone reactants are replaced respectively by 5-chloro-2,4-disulfamoylmercaptobenzene (from Example 1) and 1-ethyl-4-piperidone.

EXAMPLE 13.—3,3 - DIETHYL - 6 - CHLORO-7-SULFAMOYL-2,1,4-BENZOAZADITHIAN-1,1-DIOXIDE

This compound is prepared by replacing the paraformaldehyde employed in Example 1, Step B, by the ketal, 3,3-diethoxypentane, and by employing the other reactants and substantially the same reaction conditions therein described.

EXAMPLE 14.—3-BENZYL-7-SULFAMOYL-2,1,4-BENZOAZADITHIAN-1,1-DIOXIDE

By replacing the 2,4-disulfamoyl-1,5-dichlorobenzene used in Step A of Example 1 by an equivalent quantity of 2,4-disulfamoylchlorobenzene and using the other reactants and the reaction conditions described therein 2,4-disulfamoylmercaptobenzene is prepared. This compound then can be cyclized by causing it to react with phenylacetaldehyde by the procedure described in Step B of Example 1 to give 3-benzyl-7-sulfamoyl-2,1,4-benzoazadithian-1,1-dioxide.

Other 7 - sulfamoyl-2,1,4-benzoazadithian-1,1-dioxide compounds prepared by the method described in Example 1, Step B, employing the intermediates obtained as described in Step A of Example 1 or 2 are identified in Table I. These compounds were prepared by causing a 5-R-2,4-disulfamoylmercaptobenzene where R is chloro or methyl as identified in the following table, to react with the appropriate aldehyde, $R^2CHO$, also identified in the following table, to give the 3-$R^2$-6-R-7-sulfamoyl-2,1,4-benzoazadithian-1,1-dioxide compounds identified in Table I.

TABLE I

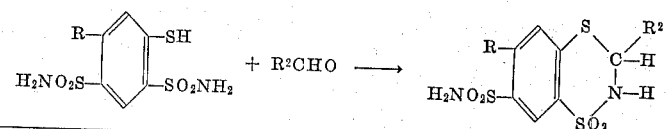

| Ex. No. | R | $R^2$ | M.P. (°C. dec.) | Analysis | | | Empirical Formula |
|---|---|---|---|---|---|---|---|
| | | | | | C | H | N | |
| 15 | Cl | Cl—CH$_2$ | 216–218 | Calc. Found | 26.44 27.07 | 2.22 2.54 | 7.72 7.57 | $C_8H_8Cl_2N_2O_4S_3$ |
| 16 | Cl | CH$_3$O—⟨⟩—CH$_3$O | 223–224 | Calc. Found | 40.00 40.42 | 3.36 3.67 | 6.22 6.13 | $C_{15}H_{15}ClN_2O_6S_3$ |
| 17 | Cl | ⟨⟩—CH$_2$— | 224–227 | Calc. Found | 41.56 42.04 | 3.24 3.96 | 6.92 6.79 | $C_{14}H_{13}ClN_2O_4S_3$ |
| 18 | Cl | H⟨⟩—CH$_2$— | 251–254 | Calc. Found | 40.98 41.76 | 4.66 4.81 | 6.82 6.71 | $C_{14}H_{19}ClN_2O_4S_3$ |
| 19 | Cl | H⟨⟩—CH$_2$— | 227–228 | Calc. Found | 39.33 39.83 | 4.32 4.30 | 7.06 7.30 | $C_{13}H_{17}ClN_2O_4S_3$ |
| 20 | CH$_3$ | ⟨⟩—CH$_2$— | 210–213 | Calc. Found | 46.83 46.90 | 4.20 4.43 | 7.28 7.23 | $C_{15}H_{16}N_2O_4S_3$ |
| 21 | CH$_3$ | H⟨⟩—CH$_2$ | 248–251 | Calc. Found | 46.20 46.34 | 5.67 5.96 | 7.17 6.97 | $C_{15}H_{22}N_2O_4S_3$ |

While the invention has been illustrated by describing the preparation of certain specific compounds by certain specific procedures, it is to be understood that the invention is not to be considered limited by the examples but rather to embrace the compounds and methods falling within the scope of the disclosure and the appended claims.

What is claimed is:

1. The process wherein a 2,4-disulfamoylmercaptobenzene is caused to react with a compound selected from the group consisting of an aldehyde, acetal, ketone and ketal to form a 7-sulfamoyl-2,1,4-benzoazadithian-1,1-dioxide.

2. The process wherein a 5-$R^1$-2,4-disulfamoylmercaptobenzene is caused to react with a compound selected from the group consisting of an aldehyde, acetal, ketone and ketal to form a 6-$R^1$-7sulfamoyl-2,1,4-benzoazadithian-1,1-dioxide wherein in each of the foregoing compounds $R^1$ is selected from the group consisting of hydrogen, halogen, trihalomethyl, lower alkyl, lower alkoxy, nitro and amino.

3. A process wherein a 5-$R^1$-2,4-disulfamoylmercaptobenzene is caused to react with chloroacetaldehyde diethylacetal to form a 3-chloromethyl-6-$R^1$-7-sulfamoyl-2,1,4-benzoazadithian-1,1-dioxide wherein in each of the foregoing compounds $R^1$ is selected from the group consisting of hydrogen, halogen, trihalomethyl, lower alkyl, lower alkoxy, nitro and amino.

4. A process wherein 5-chloro-2,4-disulfamoylmercaptobenzene is caused to react with chloroacetaldehyde diethylacetal to form 3-chloromethyl-6-chloro-7-sulfamoyl-2,1,4-benzoazadithian-1,1-dioxide.

5. A process as claimed in claim 2, wherein the reaction is carried out in the presence of a solvent and under acid conditions and with moderate heating.

6. 7-sulfamoyl-2,1,4-benzoazadithian-1,1-dioxide.

7. A benzoazadithian selected from the group consisting of a compound having the structural formula

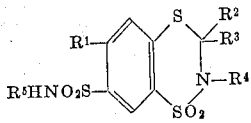

and physiologically acceptable salts thereof wherein:

$R^1$ is selected from the group consisting of hydrogen, halogen, trihalomethyl, lower alkyl, lower alkoxy, nitro and amino;

$R^2$ and $R^3$ separately are selected from the group consisting of hydrogen, lower aliphatic, mononuclear-aryl and mononuclear-aryl-lower-aliphatic, and taken together with the nuclear carbon to which they are attached represents a spiro-aliphatic group; and $R^4$ and $R^5$ separately are selected from the group consisting of hydrogen and lower-alkyl.

8. 6-halo - 7 - sulfamoyl-2,1,4 - benzoazadithian - 1,1-dioxide.

9. 6-chloro-7-sulfamoyl - 2,1,4 - benzoazadithian-1,1-dioxide.

10. 3-lower-aliphatic-6-halo - 7 - sulfamoyl-2,1,4-benzoazadithian-1,1-dioxide.

11. 3 - chloromethyl - 6 - chloro-7-sulfamoyl-2,1,4-benzoazadithian-1,1-dioxide.

12. 3-benzyl - 6 - chloro-7-sulfamoyl-2,1,4-benzoazadithian-1,1-dioxide.

13. 3-mononuclear-aryl - 6 - halo-7-sulfamoyl-2,1,4-benzoazadithian-1,1-dioxide.

14. 3-(3',4'-dimethoxyphenyl) - 6 - chloro-7-sulfamoyl-2,1,4-benzoazadithian-1,1-dioxide.

15. 6-lower alkyl - 7 - sulfamoyl-2,1,4-benzoazadithian-1,1-dioxide.

16. 6-methyl - 7 - sulfamoyl-2,1,4-benzoazadithian-1,1-dioxide.

17. Spiro-(6-lower-alkyl - 7 - sulfamoyl - 2,1,4 - benzoazadithian-1,1-dioxide-3,1'-cycloalkane).

18. Spiro[6-methyl - 7 - sulfamoyl-2,1,4-benzoazadithian-1,1-dioxide-3,1'-(4'-methyl)cyclohexane].

19. Spiro[6-chloro - 7 - sulfamoyl-2,1,4-benzoazadithian-1,1-dioxide-3,4'-(1'-ethyl)piperidine].

References Cited by the Examiner
UNITED STATES PATENTS
3,081,301  3/1963  De Stevens et al. ____ 260—243

WALTER A. MODANCE, *Primary Examiner.*

JOHN M. FORD, *Assistant Examiner.*